(12) United States Patent
Kester

(10) Patent No.: US 10,935,454 B2
(45) Date of Patent: Mar. 2, 2021

(54) SYSTEMS AND METHODS FOR REFRIGERANT LEAK MANAGEMENT

(71) Applicant: Johnson Controls Technology Company, Auburn Hills, MI (US)

(72) Inventor: Douglas A. Kester, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 431 days.

(21) Appl. No.: 15/871,698

(22) Filed: Jan. 15, 2018

(65) Prior Publication Data

US 2019/0170604 A1 Jun. 6, 2019

Related U.S. Application Data

(60) Provisional application No. 62/593,647, filed on Dec. 1, 2017.

(51) Int. Cl.
| | | |
|---|---|---|
| *G01M 3/28* | (2006.01) | |
| *G01M 3/40* | (2006.01) | |
| *F24F 11/36* | (2018.01) | |
| *G01M 3/22* | (2006.01) | |

(52) U.S. Cl.
CPC ........... *G01M 3/2807* (2013.01); *F24F 11/36* (2018.01); *G01M 3/226* (2013.01); *G01M 3/40* (2013.01)

(58) Field of Classification Search
CPC ............ F25B 2500/22; F25B 2500/221; F25B 2500/23; F25B 2500/24; F25B 2500/32; F25B 2500/222; G01M 3/007
USPC .......................................................... 62/127
See application file for complete search history.

(56) References Cited

U.S. PATENT DOCUMENTS

| | | | | |
|---|---|---|---|---|
| 5,073,753 A | * | 12/1991 | Collings | .............. G01N 27/626 324/464 |
| 7,107,786 B2 | | 9/2006 | Manole | |
| 8,820,102 B2 | | 9/2014 | Shiraishi et al. | |
| 2004/0252307 A1 | * | 12/2004 | Arno | ...................... G01N 21/78 356/437 |
| 2008/0006775 A1 | * | 1/2008 | Arno | ...................... G01N 21/05 250/338.5 |
| 2010/0314569 A1 | * | 12/2010 | Hildreth, Jr. | ............ F16K 1/165 251/212 |

(Continued)

FOREIGN PATENT DOCUMENTS

WO     2017083336     5/2017

*Primary Examiner* — Nelson J Nieves
*Assistant Examiner* — Meraj A Shaikh
(74) *Attorney, Agent, or Firm* — Fletcher Yoder, P.C.

(57) ABSTRACT

A refrigerant leak management system of a HVAC unit includes a sensor configured to detect a refrigerant in an interior of an air handling enclosure. The refrigerant leak management system includes a plurality of airflow management assemblies configured to fluidly isolate the interior of the air handling enclosure in a closed configuration. The plurality of airflow management assemblies includes a return inlet assembly, a supply outlet assembly, and a purge exhaust outlet assembly. The refrigerant leak management system includes a controller configured to actuate the purge exhaust outlet assembly based on detection of the refrigerant by the sensor such that the purge exhaust outlet assembly transitions from a closed position of the purge exhaust outlet assembly to an open position of the purge exhaust outlet assembly that opens the interior of the air handling enclosure to an external environment.

40 Claims, 10 Drawing Sheets

(56) References Cited

U.S. PATENT DOCUMENTS

| | | | |
|---|---|---|---|
| 2013/0213068 A1* | 8/2013 | Goel | F25B 49/005 |
| | | | 62/129 |
| 2015/0362204 A1 | 12/2015 | Goel et al. | |
| 2016/0178229 A1* | 6/2016 | Chen | G01M 3/228 |
| | | | 62/56 |
| 2016/0327303 A1* | 11/2016 | Tomita | F24F 11/89 |
| 2016/0363358 A1 | 12/2016 | Papas et al. | |
| 2017/0198936 A1* | 7/2017 | Yamaguchi | F25B 49/02 |
| 2018/0051922 A1* | 2/2018 | Ochiai | F25B 43/006 |
| 2018/0073762 A1* | 3/2018 | Yajima | F24F 11/0001 |
| 2018/0120194 A1* | 5/2018 | Roth | G01M 3/2815 |

* cited by examiner

SYSTEMS AND METHODS FOR REFRIGERANT LEAK MANAGEMENT

CROSS-REFERENCE TO RELATED APPLICATION

This application is a Non-Provisional application claiming priority to U.S. Provisional Application No. 62/593,647, entitled "SYSTEMS AND METHODS FOR REFRIGERANT LEAK MANAGEMENT," filed Dec. 1, 2017, which is hereby incorporated by reference in its entirety for all purposes.

BACKGROUND

The present disclosure relates generally to heating, ventilating, and air conditioning (HVAC) systems, and more particularly to systems and methods for refrigerant leak management in HVAC systems.

Residential, light commercial, commercial, and industrial HVAC systems are used to control temperatures and air quality in residences and buildings. Generally, the HVAC systems may circulate a refrigerant through a closed refrigeration circuit between an evaporator, where the refrigerant absorbs heat, and a condenser, where the refrigerant releases heat. The refrigerant flowing within the circuit is generally formulated to undergo phase changes within the normal operating temperatures and pressures of the system so that quantities of heat can be exchanged by virtue of the latent heat of vaporization of the refrigerant. As such, the refrigerant flowing within a HVAC system travels through multiple conduits and components of the circuit. Inasmuch as refrigerant leaks compromise system performance or result in increased costs, it is accordingly desirable to provide detection and response systems and methods for the HVAC system to reliably detect and respond to any refrigerant leaks of the HVAC system.

SUMMARY

In one embodiment of the present disclosure, a refrigerant leak management system of a heating, ventilation, and air conditioning (HVAC) unit includes an air handler having a return inlet, a supply outlet, and a purge exhaust, the purge exhaust routing from an interior of the air handler to an external environment and being normally closed. The refrigerant leak management system also includes a sensor configured to detect a refrigerant in the interior of the air handler. The refrigerant leak management system further includes a controller configured to: operate in a first mode to close the return inlet, the supply outlet, and the purge exhaust to facilitate detection of the refrigerant by the sensor. The controller is also configured to operate in a second mode, based on detection of the refrigerant, to open the purge exhaust to route the refrigerant from the interior of the air handler to the external environment.

In another embodiment of the present disclosure, a refrigerant leak management system of a heating, ventilation, and air conditioning (HVAC) unit includes a sensor configured to detect a refrigerant in an interior of an air handling enclosure. The refrigerant leak management system also includes a plurality of airflow management assemblies configured to fluidly isolate the interior of the air handling enclosure in a closed configuration. The plurality of airflow management assemblies includes a return inlet assembly, a supply outlet assembly, and a purge exhaust outlet assembly. Additionally, the refrigerant leak management system includes a controller configured to actuate the purge exhaust outlet assembly based on detection of the refrigerant by the sensor such that the purge exhaust outlet assembly transitions from a closed position of the purge exhaust outlet assembly to an open position of the purge exhaust outlet assembly that opens the interior of the air handling enclosure to an external environment.

In a further embodiment of the present disclosure, a refrigerant leak management system of a heating, ventilation, and air conditioning (HVAC) system includes a plurality of airflow management assemblies configured to be coupled to an air handling enclosure. The refrigerant leak management system also includes a controller configured to actuate the plurality of airflow management assemblies to isolate air within the air handling enclosure before a sensor measures a refrigerant concentration in the air handling enclosure. The controller is configured to direct isolated air from an interior of the air handling enclosure to an external environment via actuation of a purge exhaust outlet assembly of the plurality of airflow management assemblies when the refrigerant concentration is greater than a predefined concentration threshold.

In an additional embodiment of the present disclosure, a method of operating a leak management system of a heating, ventilation, and air conditioning (HVAC) system includes, in response to the HVAC system entering an OFF-cycle, closing a return inlet assembly and closing a supply outlet assembly of an air handling enclosure to block air from entering and exiting the air handling enclosure of the HVAC system. The method includes measuring a concentration of refrigerant within air of the air handling enclosure. The method includes, in response to the concentration of refrigerant being greater than a predetermined threshold, opening a purge exhaust outlet assembly and activating a supply fan disposed within the air handling enclosure to purge the air within the air handling enclosure through the purge exhaust outlet assembly and into an external environment.

In another embodiment of the present disclosure, a refrigerant leak management system of a heating, ventilation, and air conditioning (HVAC) unit includes an air handler having a return inlet, a supply outlet, and a purge exhaust, the purge exhaust routing from an interior of the air handler to an external environment and being normally closed. The refrigerant leak management system also includes a sensor configured to detect a refrigerant in an interior of the air handler, and a controller configured to open the purge exhaust upon detection of the refrigerant by the sensor.

Other features and advantages of the present application will be apparent from the following, more detailed description of the embodiments, taken in conjunction with the accompanying drawings which illustrate, by way of example, the principles of the application.

DETAILED DESCRIPTION

Figure 1:
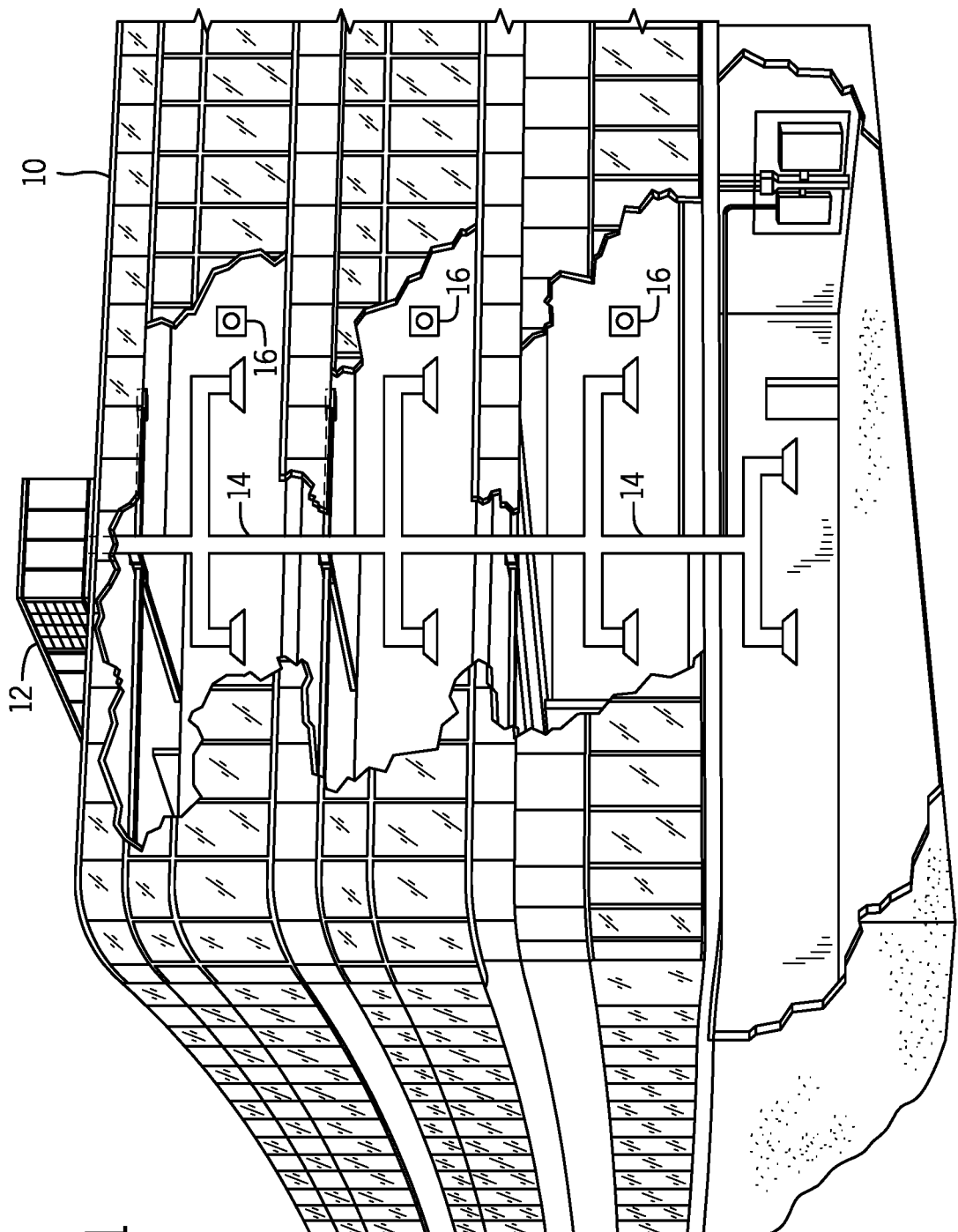
FIG. 1 is an illustration of an embodiment of a commercial or industrial HVAC system, in accordance with present techniques.

The present disclosure is directed to heating, ventilation, and air conditioning (HVAC) systems and refrigerant leak management in HVAC systems. As discussed above, a HVAC system generally includes a refrigerant flowing within a closed refrigeration circuit to enable the HVAC system to condition an interior space of a building. Traditional refrigerant inspection systems may be provided during or directly after installation of the HVAC system for a building. However, in certain embodiments, the refrigerant may inadvertently leak from a flow path of the closed refrigeration circuit due to wear or degradation to components, or imperfect joints or connections within the closed refrigeration circuit, and thus be undetected by the traditional refrigerant inspection techniques. Additionally, there is an increasing demand for detecting leaking refrigerant at lower and lower concentrations. For example, as refrigerants increase in complexity and cost, leaking refrigerant results in increased costs for operating the HVAC system. If undetected, leaking refrigerant may compromise system performance or result in increased costs. As such, the present techniques enable the HVAC system to reliably detect low concentrations of leaking refrigerant, as well as manage the leaking refrigerant.

Thus, with the foregoing in mind, present embodiments are directed to a leak management system implemented in an air handling enclosure of a HVAC system. More specifically, the disclosed air handling enclosure includes a number of airflow management assemblies positioned at the various inlets and outlets of the enclosure. For example, the enclosure may be an air handler unit of a residential HVAC system, or an air handling portion of a packaged HVAC system, as discussed below. A portion of the airflow management assemblies are capable of selectively fluidly coupling the air handling enclosure with, or fluidly isolating the air handling enclosure from, a conditioned interior space of a building. Another portion of the airflow management assemblies are capable of selectively fluidly coupling the air handling enclosure with, or fluidly isolating the air handling enclosure from, an external environment relative to the conditioned interior space of the building. The airflow management assemblies generally cooperate to enable the leak management system to effectively detect and mitigate refrigerant leaks within the enclosure.

As discussed below, the leak management system may be operated in various modes, including an idle mode, an active detection mode, and a leak response mode, based on the operation and performance of the HVAC system. For example, while the HVAC system is operating in an ON-cycle that actively conditions the interior space of the building and moves air through the enclosure, the leak management system may be operated in an idle mode, which allows the HVAC system to perform normal cooling, heating, and/or dehumidifying functions. When the HVAC system enters an OFF-cycle, the leak management system may switch to active detection mode, in which the airflow management assemblies are substantially closed so that any leaking refrigerant is captured within the enclosure and blocked from flowing or falling into the conditioned interior space of the building. It is advantageous to seal the enclosure via the airflow management assemblies to enable low concentrations of leaking refrigerant to be detected without being blown into or falling into the interior space or another space without detection means. For example, in active detection mode, a refrigerant gas concentration sensor measures a concentration of leaking refrigerant within the enclosure. When a sufficient refrigerant leak is detected, the leak management system switches to leak response mode, in which one or more airflow management assemblies are adjusted to fluidly couple the interior of the enclosure with external environment, and a supply fan within the enclosure is activated to purge the leaked refrigerant from the enclosure and into the external environment. In this manner, the disclosed techniques enable detection of a leaking refrigerant within the enclosure, and enable response via suitable control actions to address the leaked refrigerant.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
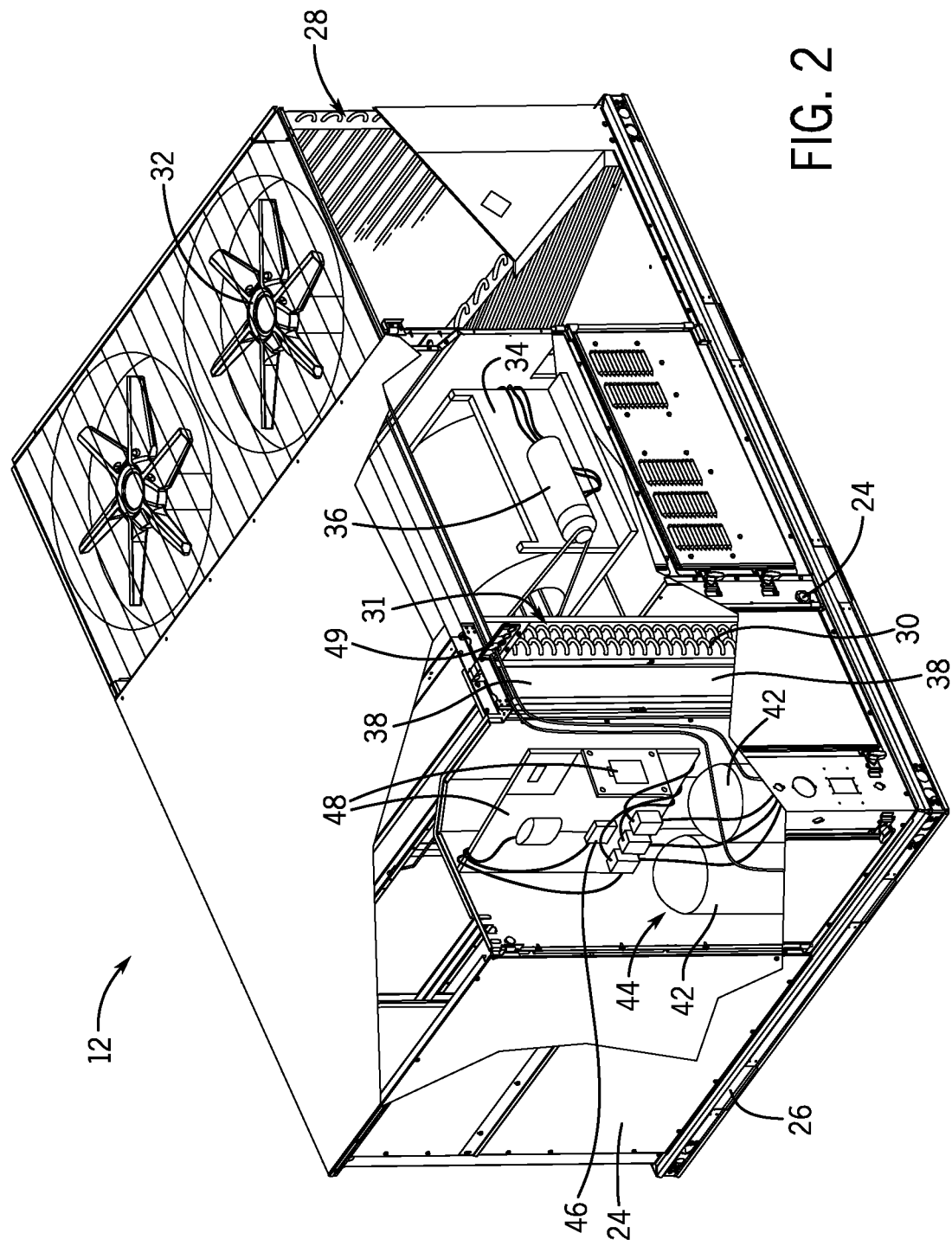
FIG. 2 is an illustration of an embodiment of a packaged unit of the HVAC system, in accordance with present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking mechanisms such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
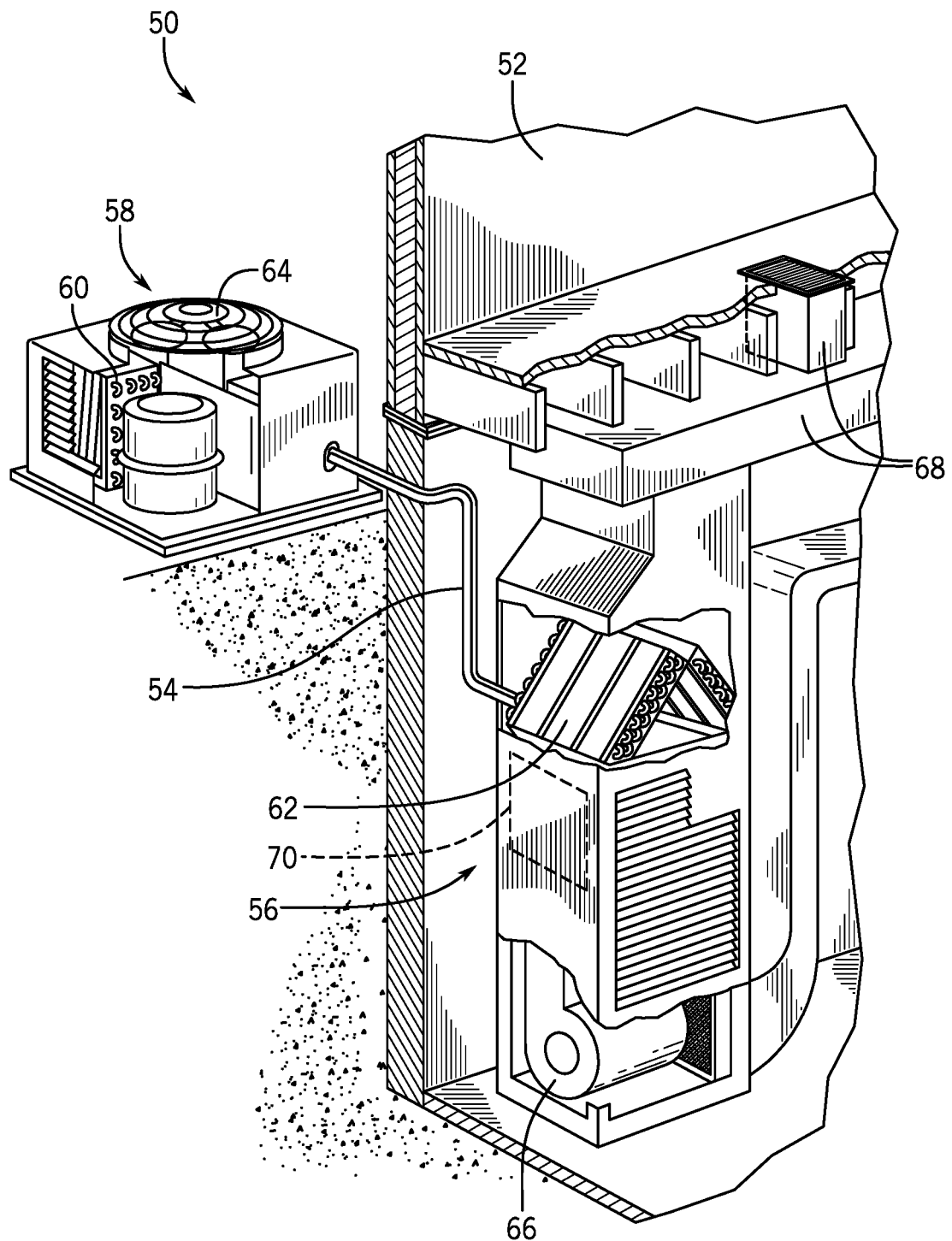
FIG. 3 is an illustration of an embodiment of a split-type HVAC system, in accordance with present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
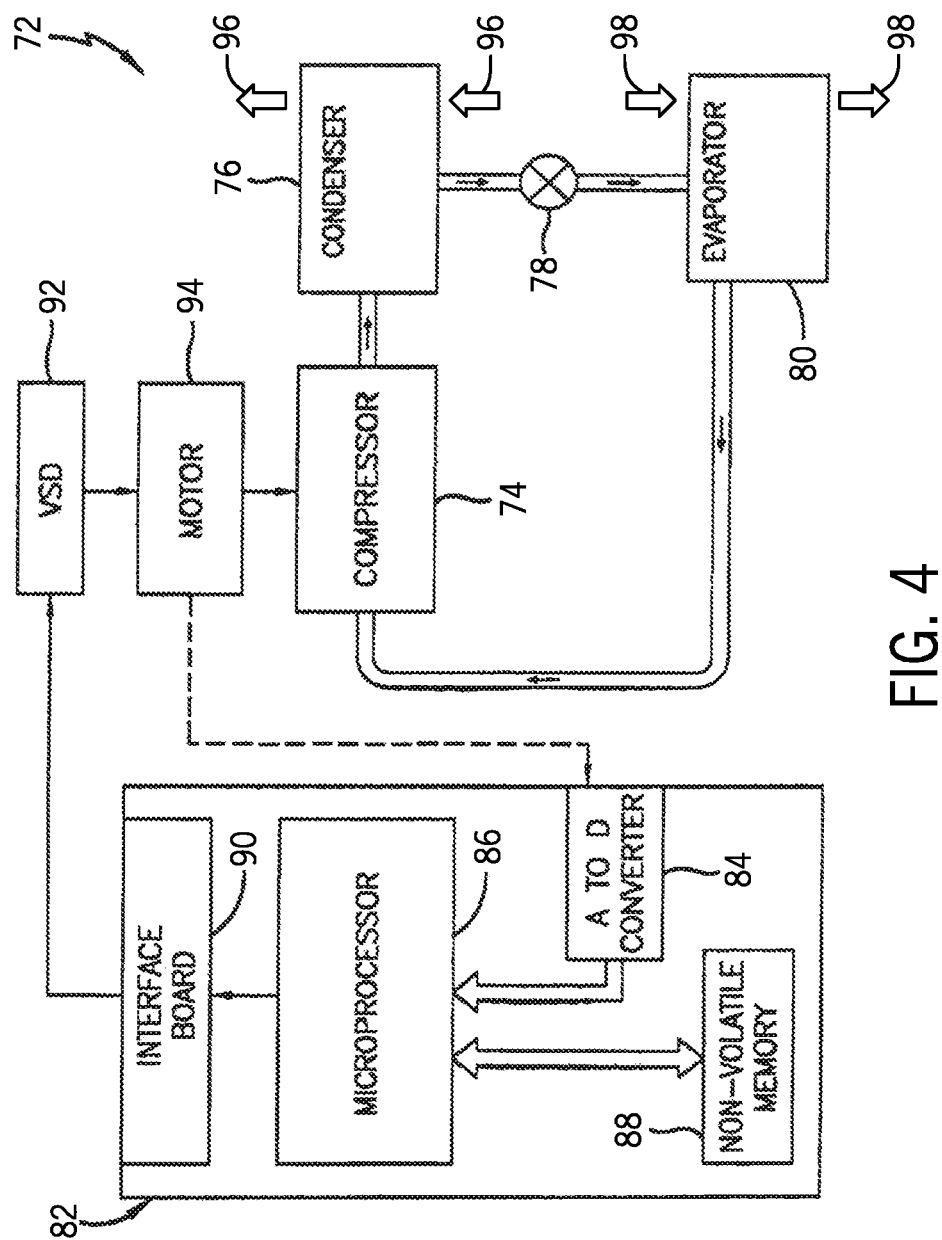
FIG. 4 is a schematic diagram of an embodiment of a refrigeration system of the HVAC system, in accordance with present techniques.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
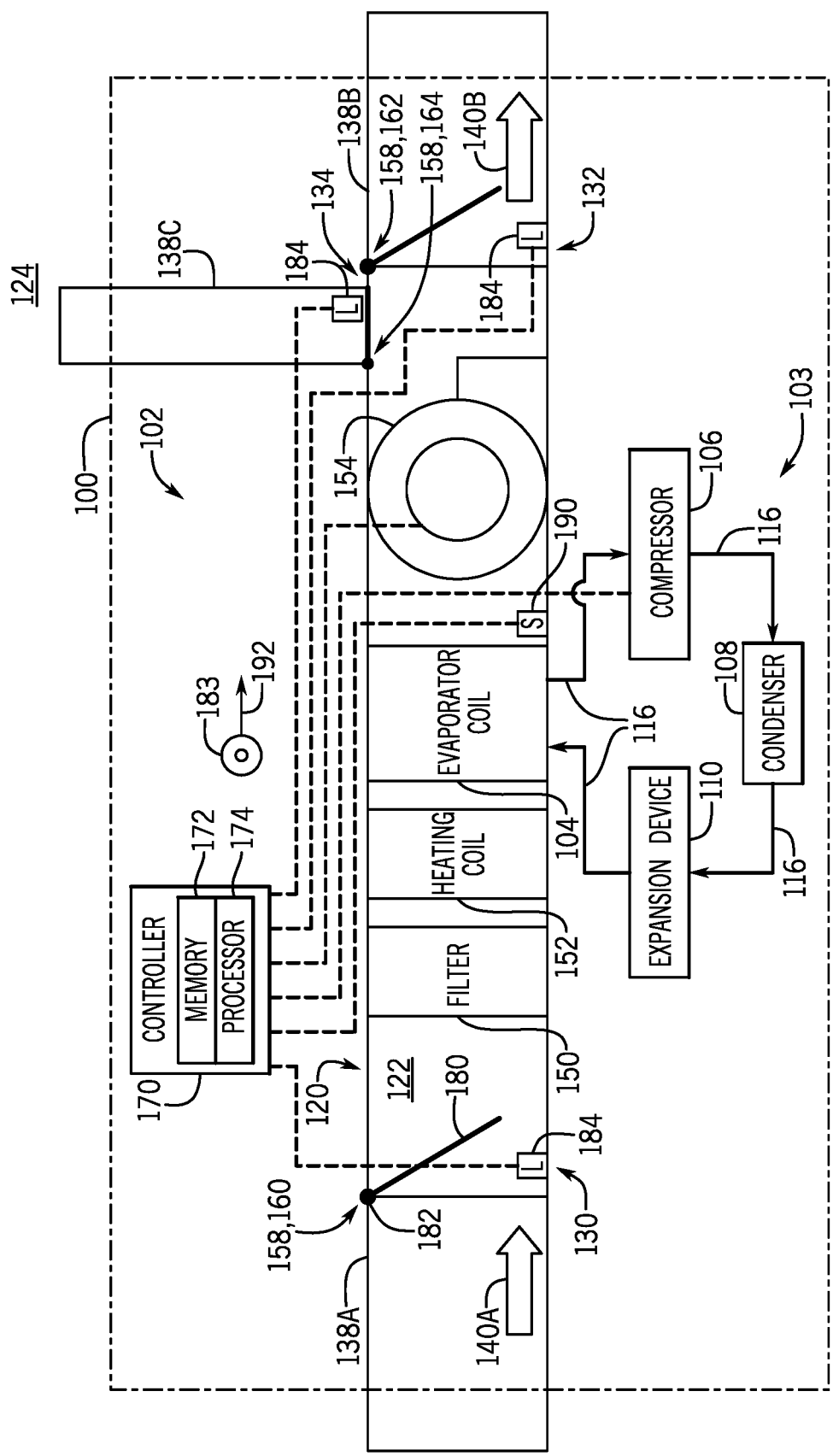
FIG. 5 is a schematic diagram of an embodiment a leak management system of the HVAC system, in accordance with present techniques.

FIG. 5 is a schematic diagram of a HVAC system 100 having a refrigerant leak management system 102 for detecting and controlling a concentration of a refrigerant that has leaked from a closed refrigeration circuit 103. As shown, the closed refrigeration circuit 103 of the HVAC system 100 includes an evaporator coil 104 fluidly coupled with a compressor 106, a condenser 108, and an expansion device 110. A refrigerant 116 flows between the HVAC components of the closed refrigeration circuit 103, undergoing phase changes that enable the HVAC system 100 to condition an interior space of a building, such as the building 10 discussed above. The refrigerant 116 may be any suitable refrigerant, such as R32, R1234ze, R1234yf, R-454A, R-454C, R-455A, R-447A, R-452B, R-454B, and the like. Each of the evaporator coil 104, the compressor 106, the condenser 108, and the expansion device 110 may correspond with any corresponding HVAC systems devices discussed above with reference to FIGS. 1-4. Moreover, the evaporator coil 104, the compressor 106, the condenser 108, and the expansion device 110 may be part of any suitable residential refrigeration system, commercial refrigeration system, split refrigeration system, and/or single unit refrigeration system. As will be discussed in more detail below, the leak management system 102 is capable of detecting a leak of the refrigerant 116 from the closed refrigeration circuit 103, and performing suitable control action to mitigate the leak of the refrigerant 116.

Additionally, the illustrated embodiment of the HVAC system 100 in FIG. 5 includes the evaporator coil 104 disposed within an enclosure 120 of the HVAC system 100. The enclosure 120 is generally an air handling enclosure of the HVAC system 100. Additionally, the enclosure 120 is a structurally strong and/or rigid container or box having walls that fluidly isolates an interior 122 of the enclosure 120 from an exterior 124 of the enclosure 120. In some embodiments, the fluid separation between the interior 122 and the exterior 124 of the enclosure 120 may be air-tight, though in other embodiments, airflow may occur across seams, joints, gaskets, or other features of the enclosure 120. Moreover, in certain embodiments, the enclosure 120 is disposed in an attic, in a supply or utility room, on a roof or wall of the building, or in another suitable location to enable conditioning the interior space of the building. Because the enclosure 120 includes certain components, such as piping, having refrigerant flowing therein, it is advantages to monitor the enclosure 120 for refrigerant leaks, such as from the piping, due to an increased amount of refrigerant sources within the enclosure 120, as compared to other portions of the HVAC system 100 without components having refrigerant flowing therein.

The disclosed enclosure 120 includes various openings that serve as inlets or outlets for airflow therethrough. For example, as illustrated in FIG. 5, the enclosure 120 includes a return inlet 130 for receiving air from the interior space, a supply outlet 132 for directing conditioned air to the interior space, and a purge exhaust outlet 134 for directing air out of the enclosure. Additionally, a plurality of ducts 138 direct the air to and from the enclosure 120. In general, the ducts 138 are passageways that fluidly connect the interior 122 of the enclosure to various locations inside or outside of the building. For example, the plurality of ducts 138 include a return inlet duct 138A coupled to the return inlet 130, a supply outlet duct 138B coupled to the supply outlet 132, and a purge exhaust outlet duct 138C coupled to the purge exhaust outlet 134. Further, in certain embodiments, the purge exhaust outlet duct 138C, which corresponds to the purge exhaust outlet 134, includes a proximal portion fluidly coupled to the purge exhaust outlet 134, and a distal portion fluidly coupled to a fresh air source, such as an environment which is external to the building and/or the enclosure 120. For example, if the enclosure 120 is disposed in an attic or utility room of the building, the purge exhaust outlet 134 may fluidly couple the interior 122 of the enclosure 120 to the outside environment. Additionally, in some embodiments, the purge exhaust outlet duct 138C may be excluded, such that the purge exhaust outlet 136 is an opening into the attic, supply room, or the outside environment.

As seen in the embodiment in FIG. 5, an airflow 140 within the HVAC system 100 includes an unconditioned airflow 140A including air from the interior space of the building. The unconditioned airflow 140A is directed into the enclosure 120 via the return inlet 130. Additionally, in some embodiments, the unconditioned airflow 140A may include outside air that is mixed with the air from the interior space. In the embodiment illustrated in FIG. 5, the unconditioned airflow 140A travels through multiple components within the enclosure 120. For example, the unconditioned airflow 140A travels through a filter 150 that removes particulates, dust, bacteria, or other undesired matter within the airflow 140. Additionally, the unconditioned airflow 140A travels through a heating coil 152 that heats the unconditioned airflow 140A to remove humidity or otherwise condition the unconditioned airflow 140A. Moreover, the unconditioned airflow 140A travels through the evaporator coil 104, which cools the unconditioned airflow 140A and/or removes dissolved moisture, such as humidity, from the unconditioned airflow 140A by enabling heat transfer between the refrigerant 116 and the unconditioned airflow 140A. Further, when actuated, a supply fan 154 receives the unconditioned airflow 140A, and moves the unconditioned airflow 140A at an increased speed and/or flowrate out of the supply outlet 132. The unconditioned airflow 140A is therefore conditioned and transformed into a conditioned airflow 140B that is sent to condition the interior space of the building having the HVAC system 100. Moreover, in certain embodiments, the supply fan 154 and/or any other suitable fans or devices of the HVAC system 100 and the leak management system 102 may be free of activation sources and/or be driven by suitable motors that are free of activation sources, including sparks.

In the embodiment illustrated in FIG. 5, the leak management system 102 includes a controller 170 to control operations therein. Additionally, for the illustrated embodiment, the controller 170 is the HVAC controller that governs operation of the entire HVAC system 100, including the compressor 106, the supply fan 154 and more, in addition to the leak management system 102. The controller 170 may include a distributed control system (DCS) or any computer-based workstation. For example, the controller 170 can be any device employing a general purpose or an application-specific processor 174, both of which may generally include memory 172 or suitable memory circuitry for storing instructions and/or data. However, in certain embodiments, the controller 170 may be a separate controller for controlling the leak management system 102 that is communicatively coupled to exchange data and/or instructions with a HVAC controller or another suitable master controller.

The processor 174 illustrated in FIG. 5 may include one or more processing devices, and the memory 172 may include one or more tangible, non-transitory, machine-readable media collectively storing instructions executable by the processor 174 to control the leak management system 102 and/or the HVAC system 100. The processor 174 of the controller 170 provides control signals to operate the leak management system 102 and the HVAC system 100 to perform the control actions disclosed herein. More specifically, as discussed below, the controller 170 receives input signals from various components of the HVAC system 100 and outputs control signals to control and communicate with various components in the HVAC system 100. The controller 170 may provide suitable control signals to control the flowrates, motor speeds, and valve positions, among other parameters, of the HVAC system 100.

Although the controller 170 has been described as having the processor 174 and the memory 172, it should be noted that the controller 170 may include or be communicatively coupled to a number of other computer system components to enable the controller 170 to control the operations of the HVAC system 100 and the related components. For example, the controller 170 may include a communication component that enables the controller 170 to communicate with other computing systems and electronic devices, such as alarm systems. The controller 170 may also include an input/output component that enables the controller 170 to interface with users via a graphical user interface or the like. In addition, the communication between the controller 170 and other components of HVAC system 100 may be via a wireless connection, such as a connection through Bluetooth® Low Energy, ZigBee®, WiFi®, or may be a wired connection, such as a connection through Ethernet. In some embodiments, the controller 170 may include a laptop, a smartphone, a tablet, a personal computer, a human-machine interface, or the like. Additionally, the embodiments disclosed herein may be at least partially embodied using hardware implementations. For example, logic elements of the controller 170 may include a field-programmable gate array (FPGA), or other specific circuitry.

Moreover, the leak management system 102 includes several components to detect and manage leaks of the refrigerant 116 into the enclosure 120. As shown in the embodiment in FIG. 5, a plurality of airflow management assemblies 158 is disposed within the enclosure 120 to control the flow of air into or from the enclosure 120. As used herein, controlling a flow of air is intended to cover blocking or allowing the flow of air into our out of respective spaces. Thus, the plurality of airflow management assemblies 158 includes a return inlet assembly 160, a supply outlet assembly 162, and a purge exhaust outlet assembly 164 respectively disposed within the return inlet 130, the supply outlet 132, and the purge exhaust outlet 134. In certain embodiments, the return inlet assembly 160, the supply outlet assembly 162, and the purge exhaust outlet assembly 164 are normally closed, such as during idle modes of the HVAC system 100, such that any leaking refrigerant is able to accumulate within the enclosure 120 for detection at a low concentration. As such, during active operation of the HVAC system and during leak response modes discussed herein, each of the plurality of airflow management assemblies 158 may be actuated to an open position as desired. However, in other embodiments, the normal position of each of the plurality of airflow management assemblies 158 may vary, such as according to a current operating mode of the leak management system 102. A normal position may be defined as a position to which an assembly defaults.

For example, each airflow management assembly 158 receives control signals from the processor 174 of the controller 170 that instruct each airflow management assembly 158 to move between an open position that enables air to flow through the respective inlet or outlet having the airflow management assembly 158 or to traverse the airflow management assembly 158, and a closed position that blocks air from flowing through the respective inlet or outlet having the airflow management assembly 158. In some embodiments, the closed position of each airflow management assembly 158 create an air-tight seal between the enclosure 120 and the duct 138 associated with each airflow management assembly 158. Thus, the airflow management assemblies 158 are capable of being controlled to selectively maintain air within the enclosure 120, or to enable the air to flow out of the enclosure 120 in a specific manner, as discussed in more detail below. Additionally, closed or open positions or configurations of the airflow management assemblies 158 are intended to respectively cover substantially or partially closed positions and substantially or partially open positions.

In some embodiments, as shown in the leak management system 102 illustrated in FIG. 5, each airflow management assembly 158 includes a damper 180 that pivots circumferentially around a pivot member 182. In some embodiments, the pivot member 182 includes pins that extend along an axis 183 into or out of the page into recesses or openings in the enclosure 120 to provide an axis of rotation of the damper 180. Further, in some embodiments, the airflow management assemblies 158 may include computer-responsive or active elements which operate to alter their state and/or position in response to control signals provided from the controller 170. For example, as shown in the embodiment in FIG. 5, locking mechanisms 184 are included as a component of each airflow management assembly 158. The locking mechanisms 184 selectively lock to hold each damper 180 closed and/or selectively unlock to enable each damper 180 to open based on control signals received from the controller 170. That is, each illustrated locking mechanism is actuatable by the controller 170 to extend within the inlets and outlets of the enclosure 120 to block or prevent the damper 180 from pivoting to the open position. Further, in response to pressure or airflows pressing against an unlocked damper 180, the unlocked damper 180 may swing open to enable the airflows to pass therethrough. In other embodiments, each airflow management assembly 158 may include a suitable drive mechanism that enables the damper 180 to rotate around the pivot member 182 between an open and a closed position based on control signals received from the controller 170. For example, the drive mechanism may include any suitable motor, shaft, belt, gears, or the like. Additionally, specific examples of the drive mechanism and the locking mechanisms 184 are discussed with reference to FIGS. 9 and 10 below.

Although discussed herein as including computer-responsive elements, other contemplated embodiments include airflow management assemblies 158 having one or more passive components that operate without instruction from the controller 170. In such embodiments, the dampers 180 of the airflow management assemblies 158 may be barometric dampers capable of being be pushed open when the airflow 140 passes through the dampers 180, and that remain closed when the airflow 140 is not present. In certain conditions, the airflow 140 is not present when the supply fan 154 is not active. Additionally, in some embodiments, the dampers 180 may be self-closing and/or reverse spring-loaded to facilitate the closing of the dampers 180. Moreover, in further embodiments, a portion of the airflow management assemblies 158 are actively controlled, computer-responsive elements, and another portion of the airflow management assemblies 158 are passively or indirectly controlled by the controller 170 via control of the supply fan 154. For example, the purge exhaust outlet assembly 164 may be actively controlled in some embodiments, while the return inlet assembly 160 and the supply outlet assembly 162 are passively controlled.

As mentioned, the leak management system 102 may switch between various operating modes, such as idle mode, active detection mode, and leak response mode, to enable detection and mitigation of refrigerant leaks. In general, the operating modes of the leak management system 102 are coordinated with cycles of the HVAC system 100. For example, the HVAC system 100 is capable of cycling through the ON-cycle in which the compressor 106 moves the refrigerant 116 within the closed refrigeration circuit 103 to condition the interior space, and an OFF-cycle in which the compressor 106 does not move the refrigerant 116 through the closed refrigeration circuit 103. The embodiment of the HVAC system 100 illustrated in FIG. 5 is in an ON-cycle that conditions the interior space of the building. For the illustrated embodiment, when the HVAC system 100 is in the ON-cycle, the leak management system 102 instructs the return inlet assembly 160 and the supply outlet assembly 162 to enable the airflow 140 to flow therethrough. That is, the processor 174 of the controller 170 instructs the locking mechanisms 184 associated with the return inlet assembly 160 and the supply outlet assembly 162 to unlock, thus enabling the dampers 180 to open in response to the airflow 140. Additionally, the controller 170 activates the compressor 106, which cycles the refrigerant 116 to condition the airflow 140. Additionally, the HVAC system 100 drives the supply fan 154, which provides the airflow 140 to and from the interior space of the building. Thus, in the embodiment shown in FIG. 5, the airflow 140 moving through the enclosure 120 blocks a refrigerant leak from accumulated within the enclosure. Accordingly, because the processor 174 determines that the HVAC system 100 is in the ON-cycle, the leak management system 102 conserves computing power, energy, and/or sensor life by operating in an idle mode that does not sense a sufficient concentration of refrigerant.

Figure 6:
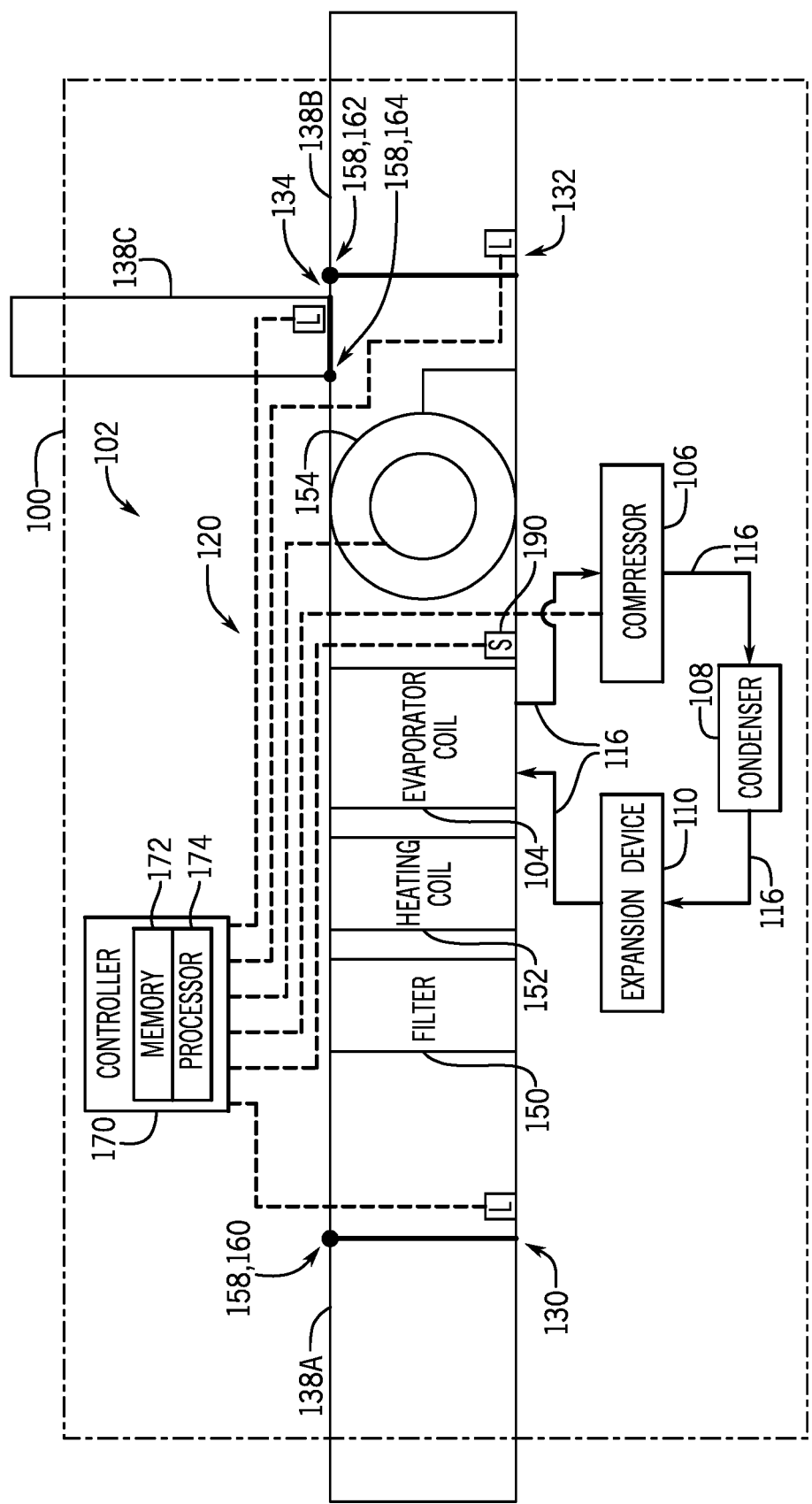
FIG. 6 is a schematic diagram of the embodiment of the leak management system of FIG. 5 in an idle mode, in accordance with present techniques.

FIG. 6 is a schematic diagram of an embodiment of the HVAC system 100 in the OFF-cycle. The HVAC system 100 is in the OFF-cycle whenever the compressor 106 is not active. Further, when the HVAC system 100 is in the OFF-cycle and when a fan-only, ventilation function of the HVAC system 100 is not requested, the processor 174 may instruct the supply fan 154 to deactivate. Thus, without the force of the airflow 140, the illustrated airflow management assemblies 158 remain in the closed position to isolate air within the enclosure 120. In certain embodiments, the controller 170 also sends control signals to instruct the locking mechanisms 184 to lock. In this manner, a leak of the refrigerant 116 within the enclosure 120 and/or from the evaporator coil 104 may be confined to build up within the enclosure 120 without flowing or falling through the return inlet 130 or the supply outlet 132 and into the interior space of the building. Accordingly, when the processor 174 determines that the HVAC system 100 is in the OFF-cycle, the controller 170 operates the leak management system 102 in active detection mode to monitor a concentration of the refrigerant 116 within the enclosure 120. However, in other embodiments without the locking mechanisms 184 and/or without computer-responsive components, the dampers 180 may be self-closing dampers that automatically rotate via gravity, springs, or suitable other force applying mechanisms back to the closed position when an airflow is not present.

To detect leaks in active detection mode, such as when the HVAC system 100 is in the OFF-cycle, the leak management system 102 illustrated in FIGS. 5 and 6 include a concentration sensor 190. The concentration sensor 190 is communicatively coupled to the controller 170 to transmit sensor signals to the controller 170 indicative of a concentration of the refrigerant 116 within the interior 122 of the enclosure 120. The concentration sensor 190 is disposed proximate the evaporator coil 104. Additionally, as used herein, the concentration sensor 190 is "proximate" the evaporator coil 104 when the concentration sensor 190 is capable of measuring a concentration of the refrigerant 116 within sensing range of the evaporator coil 104, disposed within a threshold distance of the evaporator coil 104 and/or adjacent to the evaporator coil 104. In some embodiments, the concentration sensor 190 is downstream of the evaporator coil 104 relative to an airflow direction 192 through the enclosure 120, though in some embodiments, the concentration sensor 190 is disposed upstream of the evaporator coil 104 or in another location suitable for sensing the concentration of the refrigerant 116. When disposed proximate the evaporator coil 104, it is presently recognized that the concentration sensor 190 is closer to a greater quantity of welding joints or potential leaks of the refrigerant 116 from the evaporator coil 104, thus enhancing detection of the refrigerant leaks. Additionally, although only one concentration sensor 190 is discussed herein, any suitable number of concentration sensors 190 may be included within the enclosure 120 and/or proximate the evaporator coil 104. For example, in certain embodiments having multiple concentration sensors 190 included in the enclosure, the processor 174 is capable of triangulating, locating, or pinpointing a position of a refrigerant leak via the signals received from the multiple concentration sensors 190.

The concentration sensors 190 may be any type of concentration sensors, including electrochemical gas detectors, catalytic bead sensors, photoionization detectors, infrared point sensors, infrared imaging sensors, semiconductor sensors, ultrasonic gas detectors, holographic gas sensors, or any other suitable concentration sensor capable of detecting a concentration of the refrigerant 116. Moreover, although discussed herein as having concentration sensors 190, the leak management system 102 may, additionally or alternatively, include other sensors suitable for detecting a presence of the refrigerant 116 within the enclosure 120, such as temperature sensors, pressure sensors, acoustic sensors, flowrate sensors, or the like. Accordingly, with the above understanding of the components of the leak management system 102, further understanding of the example embodiment of the leak management system 102 operating in active detection mode (FIG. 6) and leak response mode (FIGS. 7 and 8) discussed below may be more readily understood.

In active detection mode, the controller 170 of the illustrated leak management system 102 receives the signals from the concentration sensor 190 indicative of the concentration of the refrigerant 116 within the enclosure 120. Then, based on the signals, the controller 170 determines the concentration of the refrigerant 116. For example, during operation of the HVAC system 100, a leak of the refrigerant 116 may not be present. Thus, if no leak of the refrigerant 116 is present, the controller 170 may determine that the concentration of the refrigerant 116 is below a lower detection limit of the concentration sensor 190. However, when refrigerant 116 leaks from the evaporator coil 104 and is sensed by the concentration sensor 190, the controller 170 receives the signals and determines a non-zero concentration of the refrigerant 116 within the enclosure 120.

Additionally, the controller 170 compares the concentration of the refrigerant 116 to a predefined concentration threshold. The predefined concentration threshold may be a user-set, technician-set, or distributor-set value that is stored within the memory 172 of controller 170, either before or after the controller 170 is placed into operation within the HVAC system 100. In response to determining that the concentration of the refrigerant 116 is less than or equal to the predefined concentration threshold, the controller 170 continues to operate the leak management system 102 in the active detection mode to continue to determine the concentration of the refrigerant 116. In some embodiments, the controller 170 and the concentration sensor 190 may also wait a predefined time threshold before determining the concentration of the refrigerant 116 again, thus enhancing a useable life of the concentration sensor 190. In certain embodiments, the predefined time threshold is set as 1 minute, 5 minutes, 10 minutes, 60 minutes, or more.

In certain embodiments, in response to determining that the concentration of the refrigerant 116 is greater than the predefined concentration threshold, the controller 170 determines that a leak of the refrigerant 116 is present within the enclosure 120. Thus, to perform suitable control actions for managing the detected leak of the refrigerant 116, the leak management system 102 enters the leak response mode. Two embodiments of the leak response mode are described below with reference to FIGS. 7 and 8.

Figure 7:
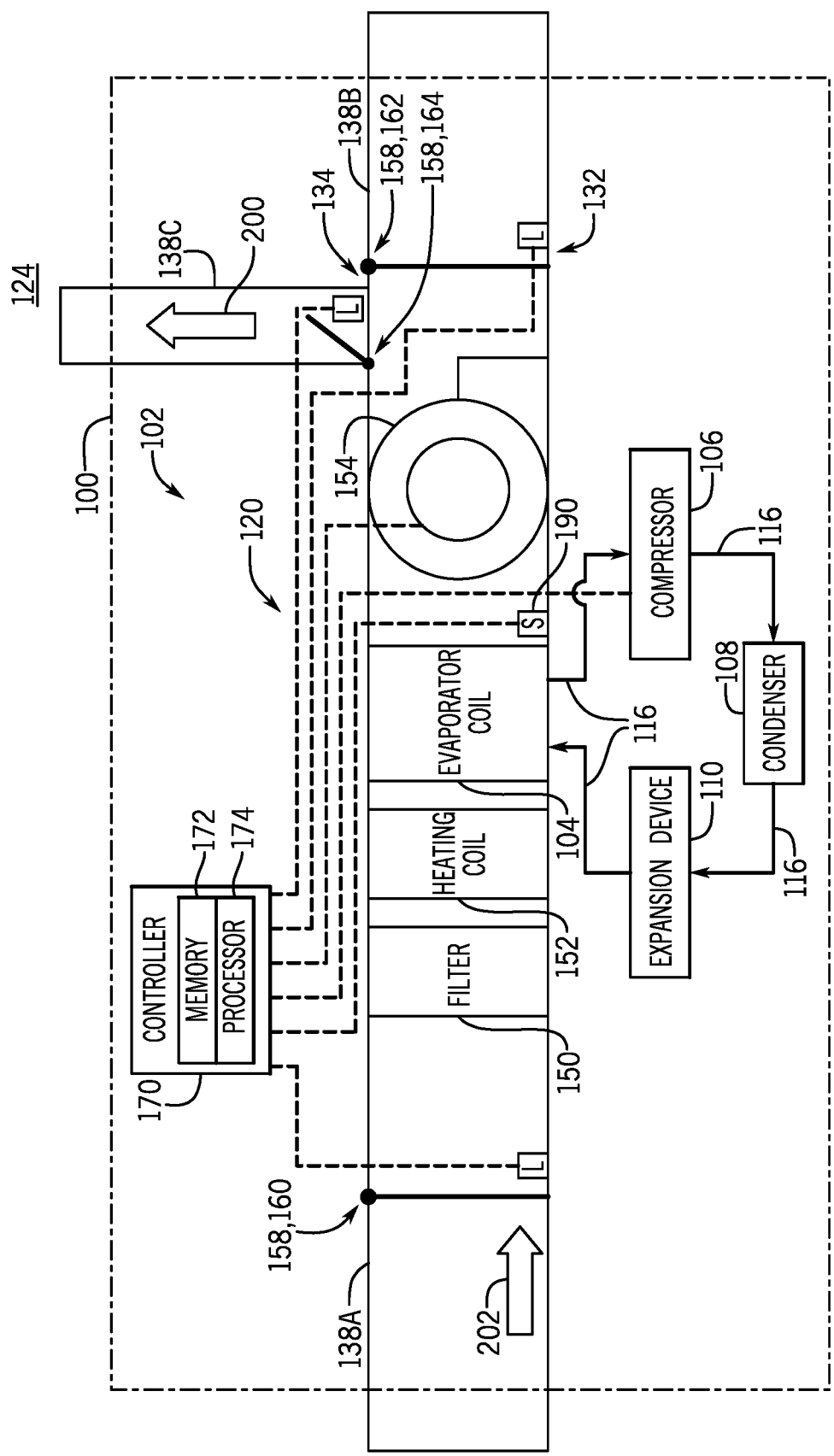
FIG. 7 is a schematic diagram of the embodiment of the leak management system of FIG. 5 in a leak response mode, in accordance with present techniques.

For example, FIG. 7 is a schematic diagram of the embodiment of the HVAC system 100 with the leak management system 102 in leak response mode. In leak response mode, the processor 174 of the controller 144 provides one or more control signals modifying operation of the HVAC system 100. In some embodiments, the control signals prompt the HVAC system 100 to provide alerts and/or mitigating actions for a detected refrigerant leak identified via the concentration of the refrigerant 116 within the enclosure 120 that exceeds the predefined concentration threshold. For example, the controller 170 may transmit the control signal to instruct a device, such as a thermostat, a user device, and/or a service technician workstation, to generate an alert indicative of the detected refrigerant leak. In some embodiments, the alert also includes instructions to deactivate activation sources and/or to instruct users to respond appropriately. Once informed of the detected refrigerant leak, users may perform manual control actions in response to the detected refrigerant leak, such as shutting off the HVAC system 100 or repairing a portion of the evaporator coil 104.

Additionally or alternatively, the control signals from the controller 170 may modify operation of the leak management system 102 to mitigate the detected refrigerant leak. For example, control signals may instruct the airflow management assemblies 158 of the leak management system 102 to move to a leak response orientation or closed configuration corresponding to the leak response mode, and then operate the supply fan 154 to purge or draw air from the enclosure 120, as illustrated in FIG. 7. More particularly, as shown in the embodiment of the leak management system 102 in the leak response orientation, the return inlet 130 and the supply outlet 132 are closed via the return inlet assembly 160 and the supply outlet assembly 162, respectively. Indeed, as illustrated, the controller 170 has instructed the locking mechanisms 184 of the return inlet assembly 160 and the supply outlet assembly 162 to actuate to a locked position, thus blocking the corresponding dampers 180 from rotating to an open position in response to an airflow generated when the supply fan 154 is activated to vent the enclosure 120. Additionally, the locking mechanism 184 of the purge exhaust outlet 134 is actuated to an unlocked position, enabling the corresponding damper 180 to rotate to an open position in response to a suitable airflow.

Further, as illustrated in FIG. 7, the controller 170 activates the supply fan 154 to move a purge airflow 200 from the enclosure 120 though the purge exhaust outlet 134. The illustrated leak response orientation of the airflow management assemblies 158 fluidly couples the interior 122 of the enclosure 120 to an environment outside of the enclosure 120 and/or the building via the purge exhaust outlet 134 and corresponding purge exhaust outlet duct 138C, while fluidly blocking the interior 122 of the enclosure 120 from the interior space of the building.

When in the active detection mode, the leak management system 102 fluidly seals or isolates the interior 122 of the enclosure 120 to block or prevent spreading of the leak throughout the building. Additionally, the control signals provided by the controller 170 in the subsequent leak response mode operate the leak management system 102 to dilute, remove, or mitigate refrigerant 116 sourced from the detected refrigerant leak until the detected refrigerant leak is resolved. Moreover, one or more of the above modifications to the HVAC system 100 may be performed simultaneously or within a time threshold to more rapidly respond to the detected refrigerant leak. Additionally, in some embodiments, the controller 170 may disable the HVAC system 100 from operating until after the concentration of the refrigerant is again within the predefined concentration threshold, or until after the detected refrigerant leak is repaired. In some embodiments, the controller 170 determines the detected refrigerant leak is repaired based on user input received from a user device indicative of a completed repair. As such, the embodiments of the HVAC system 100 that include the disclosed leak management system 102 are able to purge the leaked refrigerant from the enclosure 120.

In some embodiments, the controller 170 may employ a feedback loop to dynamically adjust the modifications to the HVAC system 100 and leak management system 102 in leak response mode. That is, the processor 174 of the controller 170 may implement a dynamic response strategy that monitors the concentration of the refrigerant 116 after the refrigerant leak is detected to evaluate an effectiveness of the modifications to the HVAC system 100. Thus, the controller 170 further modifies and/or adjusts operation of the HVAC system 100 and the leak management system 102 based on the determined effectiveness. For example, in certain embodiments, after determining that the concentration of the refrigerant 116 in the enclosure 120 is above the predefined concentration threshold, the controller 170 may instruct the supply fan 154 to increase a fan speed of the supply fan 154 by adjusting a parameter of power provided to the supply fan 154. Then, the controller 170 may receive signals indicative of the concentration of the refrigerant 116 from the concentration sensor 190 in the enclosure 120. In some embodiments, the signals are received continuously, at regular intervals, every minute, every 10 minutes, or the like. If the controller 170 determines that the concentration of the refrigerant 116 has dropped or is dropping below the predefined concentration threshold in response to the increased fan speed, the controller 170 may instruct the supply fan 154 to return to a normal operating fan speed.

However, if the controller 170 determines that the concentration of the refrigerant 116 is still above the predefined concentration threshold or is still increasing after a predetermined amount of time, such as 1 minute, 5 minutes, 10 minutes, or more, the controller 170 may instruct the supply fan 154 to further increase the fan speed thereof, moving more air and leaked refrigerant 116 within the purge airflow 200 from the enclosure 120 and out through the purge exhaust outlet 134. The dynamic response strategy may be implemented across any range of fan speeds that the supply fan 154 may produce. Thus, the controller 170 controls the leak management system 102 to both detect and mitigate detected refrigerant leaks from the HVAC system 100 to block or prevent the refrigerant 116 from reaching the predefined concentration threshold.

In further embodiments, the leak management system 102 includes an additional verification sensor disposed within the enclosure 120 or within any suitable duct 138 to detect whether the leak management system 102 is purging the detected refrigerant leak from the enclosure. For example, in certain embodiments, the verification sensor is a flowrate sensor capable of measuring a flowrate produced by the supply fan 154 through the purge exhaust outlet 134 and/or the purge exhaust outlet duct 138C. Thus, the flowrate sensor provides feedback to the controller 170 indicative of the flowrate produced by the supply fan 154. The controller 170 compares the flowrate produced by the supply fan 154 to a target flowrate set for the supply fan 154 to determine whether the actual flowrate is within a threshold of the target flowrate. If the actual flowrate is outside of the threshold of the target flowrate, the controller 170 may perform a suitable control action, such as providing control signals that generate and provide alerts indicative of the actual flow rate of the supply fan 154 being outside of the threshold from the target flowrate, increasing other control actions, shutting down the leak management system 102, or any other suitable control action. Moreover, any other suitable parameter may be monitored and controlled based on input from other suitable verification sensors, such as a pressure sensor or a temperature sensor.

In certain embodiments, as the purge airflow 200 is moved out of the enclosure 120, one or more replacement airflows 202 are drawn into the enclosure. Generally, the replacement airflows 202 do not include leaked refrigerant 116, such that the replacement airflows 202 provided into the enclosure 120 dilute any concentration of the refrigerant 116 leaked into the enclosure 120. The replacement airflows 202 may be provided into the enclosure 120 via any suitable airflow path, such as a gap or an opening between an airflow management assembly 158 and a corresponding inlet of the enclosure 120. Indeed, a negative pressure caused by the operation of the supply fan 154 may draw the replacement airflows 202 from various suitable air sources that are fluidly coupled to the enclosure 120.

Figure 8:
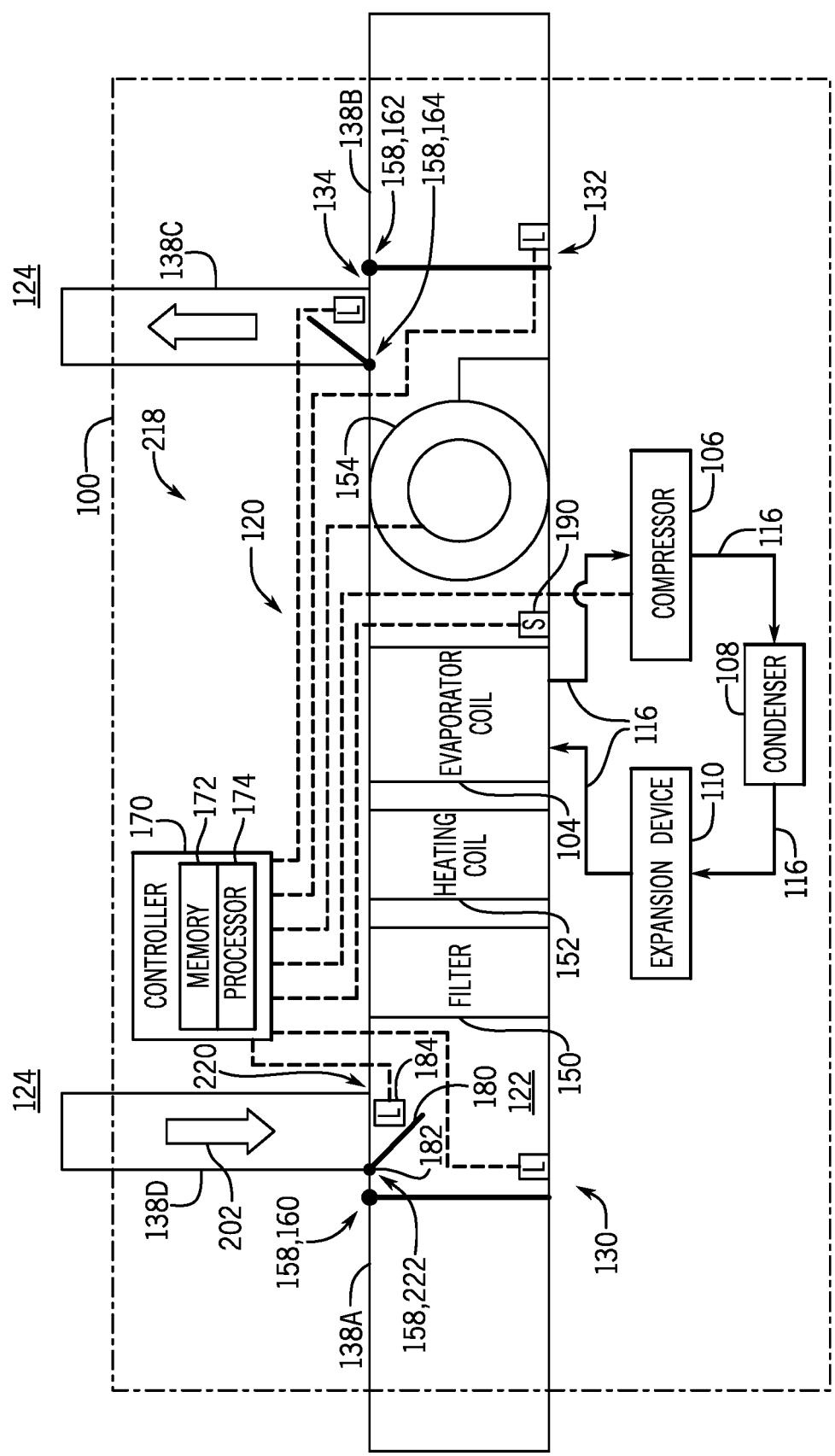
FIG. 8 is a schematic diagram of the embodiment of the leak management system of FIG. 6 in a leak response mode, in accordance with present techniques.

Moreover, FIG. 8 is a schematic diagram of another embodiment of the HVAC system 100 having a leak management system 218 in leak response mode. The illustrated embodiment of the leak management system 218 includes the components shown in FIG. 7 and discussed above. However, the leak management system 218 also includes a purge inlet 220 for directing the replacement airflow 202 into the enclosure. A purge inlet assembly 222 having a damper 180 that pivots between an open and a closed position around a pivot member 182 is disposed within the purge inlet 220. The illustrated purge inlet assembly 222 also includes a locking mechanism 184 that receives control signals from the controller 170 to selectively actuate to maintain the damper 180 of the purge inlet assembly 222 in the closed position, or to remain unactuated to enable the damper 180 to move to an open position in response to an airflow. Other embodiments of the purge inlet assembly 222 may be actuated in other manners, as discussed above.

In the present embodiment of the leak management system 218, a purge inlet duct 138D is fluidly coupled between the purge inlet 220 and a location having air without leaked refrigerant, such as environmental air from the exterior 124 of the enclosure 120. For example, a proximal end of the purge inlet duct 138D may be fluidly coupled to the purge inlet 220, and a distal end of the purge inlet duct 138D may be fluidly coupled to an exterior of the building. In some embodiments, the distal end of the purge inlet duct 138D is coupled to the exterior of the building at an opposite or different side of the building than the purge exhaust outlet duct 138C.

In embodiments in which the controller 170 places the HVAC system 100 and the leak management system 102 in active detection mode, the purge inlet assembly 222 remains closed like the other airflow management assemblies 158, such as the return inlet assembly 160, the supply outlet assembly 162, and the purge exhaust outlet assembly 164. Thus, the concentration of refrigerant 116 within the enclosure 120 can accumulate to be sensed by the concentration sensor 190 disposed proximate the evaporator coil 104. The concentration sensor 190 thus transmits signals to the controller 170 indicative of the concentration of refrigerant within the enclosure 120, which the controller 170 then uses to determine the concentration of refrigerant within the enclosure 120. Additionally, the controller 170 may determine whether the concentration of the leaked refrigerant 116 within the enclosure 120 is greater than the predefined concentration threshold. In response to determining that the concentration of the refrigerant is greater than the predefined concentration threshold, the controller then moves or unlocks the airflow management assemblies 158 into the leak response orientation, as illustrated in FIG. 8. That is, the return inlet assembly 160 and the supply outlet assembly 162 are locked in the closed position, and the purge inlet assembly 222 and the purge exhaust outlet assembly 164 are not locked in the closed position or are actively actuated to an open position. Additionally, the controller 170 has instructed the supply fan 154 to operate at a target fan speed, such that the purge airflow 200 is pushed out of the purge exhaust outlet 134, and the replacement airflow 202 is drawn into the enclosure 120 via the purge inlet 220.

Moreover, in certain embodiments, existing HVAC systems 100 may be retroactively fitted with one of the leak management systems 102, 218 discussed herein. In such embodiments, the enclosure 120 may be modified by forming one or more new openings to include the purge exhaust outlet 134, or the purge exhaust outlet and the purge inlet 220. A purge exhaust outlet duct 138C may be coupled to the purge exhaust outlet 134, and a purge inlet duct 138D may be coupled to the purge inlet 220. Further, the purge exhaust outlet assembly 164 and the purge inlet assembly 222 may be disposed at the purge exhaust outlet 134 and the purge inlet 220. Thus, one of the leak management systems 102, 218, or any other suitable embodiments of leak management systems discussed herein may be added to existing enclosures of HVAC systems to enable refrigerant leak detection and mitigation.

Figure 9:
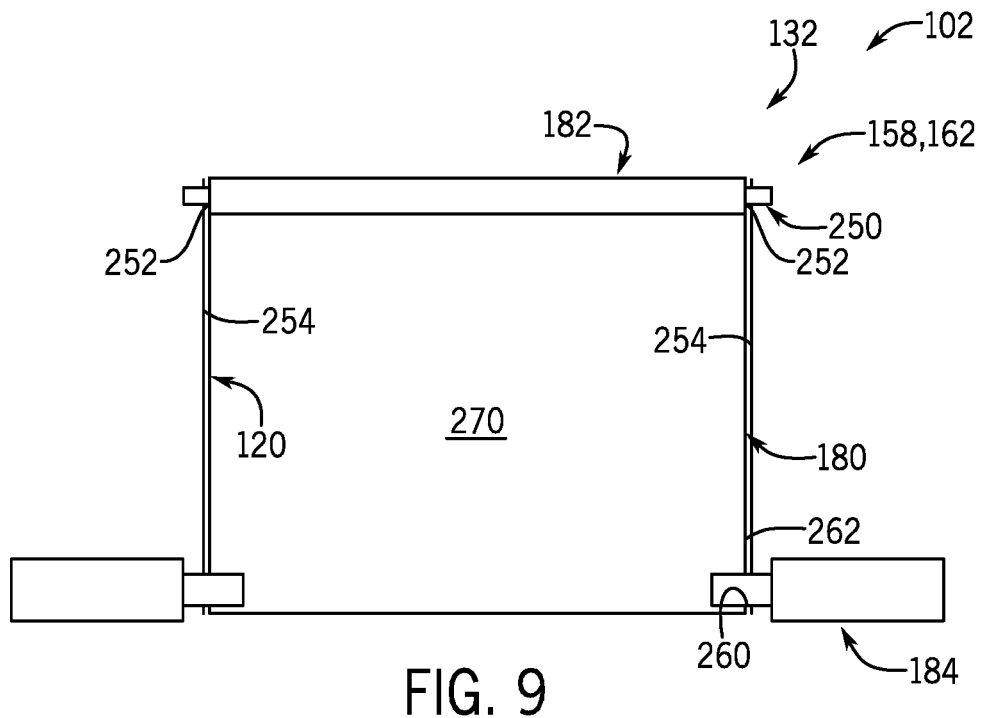
FIG. 9 is a front perspective view of an embodiment of a supply outlet assembly of the leak management system having locking mechanisms, in accordance with present techniques.

FIG. 9 is a front perspective view of an embodiment of the supply outlet assembly 162 of the leak management system 102. As illustrated, the supply outlet assembly 162 is one of the airflow management assemblies 158 disposed within the inlets and outlets of the enclosure 120. To fully or partially fluidly isolate the enclosure 120 from the duct 138 fluidly coupled to the supply outlet 132, the supply outlet assembly 162 includes the damper 180 rigidly coupled to the pivot member 182. The damper 180 may be a flexible or semi-flexible panel that is attached to, or integrally formed with, the pivot member 182 by any suitable means. Additionally, the pivot member 182 is a cylindrical or tubular member having pivot pins 250 extending therefrom to enable the damper 180 to pivot around a circumferential axis of the pivot pins 250 in response to an airflow. As shown in the present embodiment of the supply outlet assembly 162, the pivot pins 250 are disposed through openings 252 in walls 254 of the enclosure 120. However, in other embodiments, the pivot pins 250 may alternatively be held in corresponding recesses, or may be replaced by other suitable components for enabling pivoting relative to the enclosure 120.

Additionally, the leak management system 102 includes one or more of the locking mechanisms 184 discussed above. For example, as seen in the embodiment of FIG. 9, two locking mechanisms 184 include shafts 260 that extend through corresponding openings 262 in the walls 254 of the enclosure 120. The locking mechanisms 184 are linear actuators that are electrically actuated via signals from the controller 170. However, other suitable locking mechanisms, such as hydraulically actuated linear actuators may also be used in the techniques disclosed herein. The shafts 260 are extended within the duct 138 directly adjacent to the supply outlet 132, and thus lock the damper 180 in the closed position. In embodiments in which the controller 170 is not actuating the locking mechanisms 184, the shafts 260 are retracted at least partially within the corresponding openings 262, such that the damper 180 is free to rotate in response to an airflow pushing on an interior surface of the damper 180 opposite of a presently visible, exterior surface 270 of the damper 180. In other embodiments, other types of airflow management mechanisms and/or locking mechanisms may be used, in accordance with the present disclosure.

Figure 10:
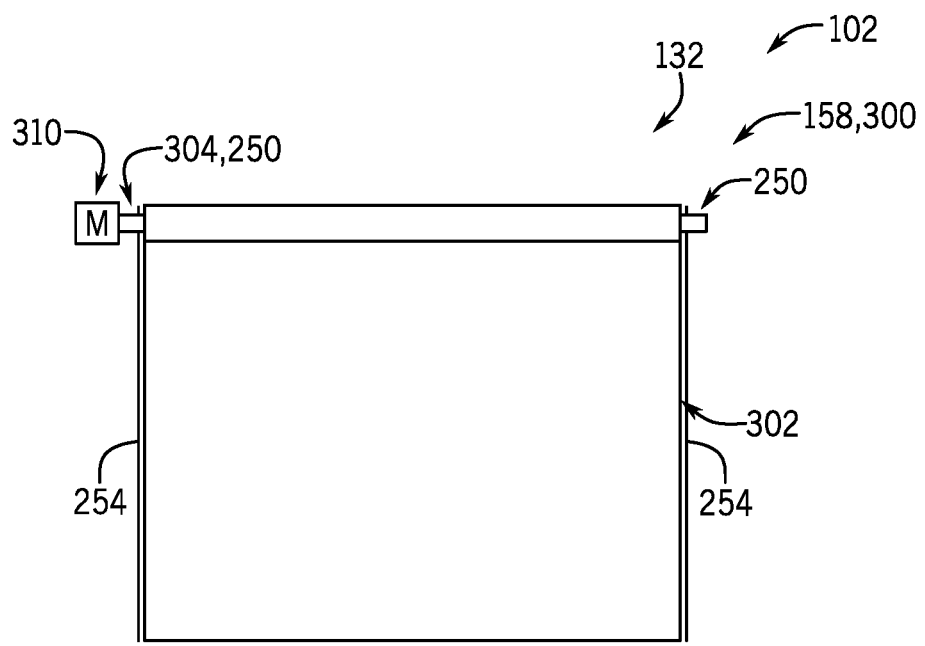
FIG. 10 is a front perspective view of an embodiment of a supply outlet assembly of the leak management system having a motorized damper, in accordance with present techniques.

For example, FIG. 10 is a front perspective view of an embodiment of a supply outlet assembly 300 of the leak management system 102. As illustrated, the supply outlet assembly 300 includes similar components to the supply outlet assembly 162 of FIG. 8. For example, the supply outlet assembly 300 also includes the pivot member 182 having the pivot pins 250 extending through the openings 252 in the walls 254 of the enclosure 120. However, the present embodiment of FIG. 9 also includes a rigid damper 302 coupled to or integrally formed with the pivot member 182. The illustrated rigid damper 302 is formed from a stiff sheet, such as a sheet made of structurally supported rubber or metal. Additionally, a proximal pivot pin 304 of the pivot pins 250 is coupled to a drive mechanism, such as an illustrated motor assembly 310. Upon instruction by the controller 170, the motor assembly 310 drives the rigid damper 302 to rotate via applying torque to the proximal pivot pin 304. In this manner, the motor assembly 310 may move the supply outlet assembly 300 to any suitable open, partially open, or closed position to enable the leak management system 102 to fluidly isolate the enclosure 120 and/or purge leaks of refrigerant therefrom. In certain embodiments, employing the motor assembly 310 in place of the locking mechanisms 184 reduces a number of components, a number of openings or recesses in the enclosure walls, and/or an installation time for the HVAC system 100.

Figure 11:
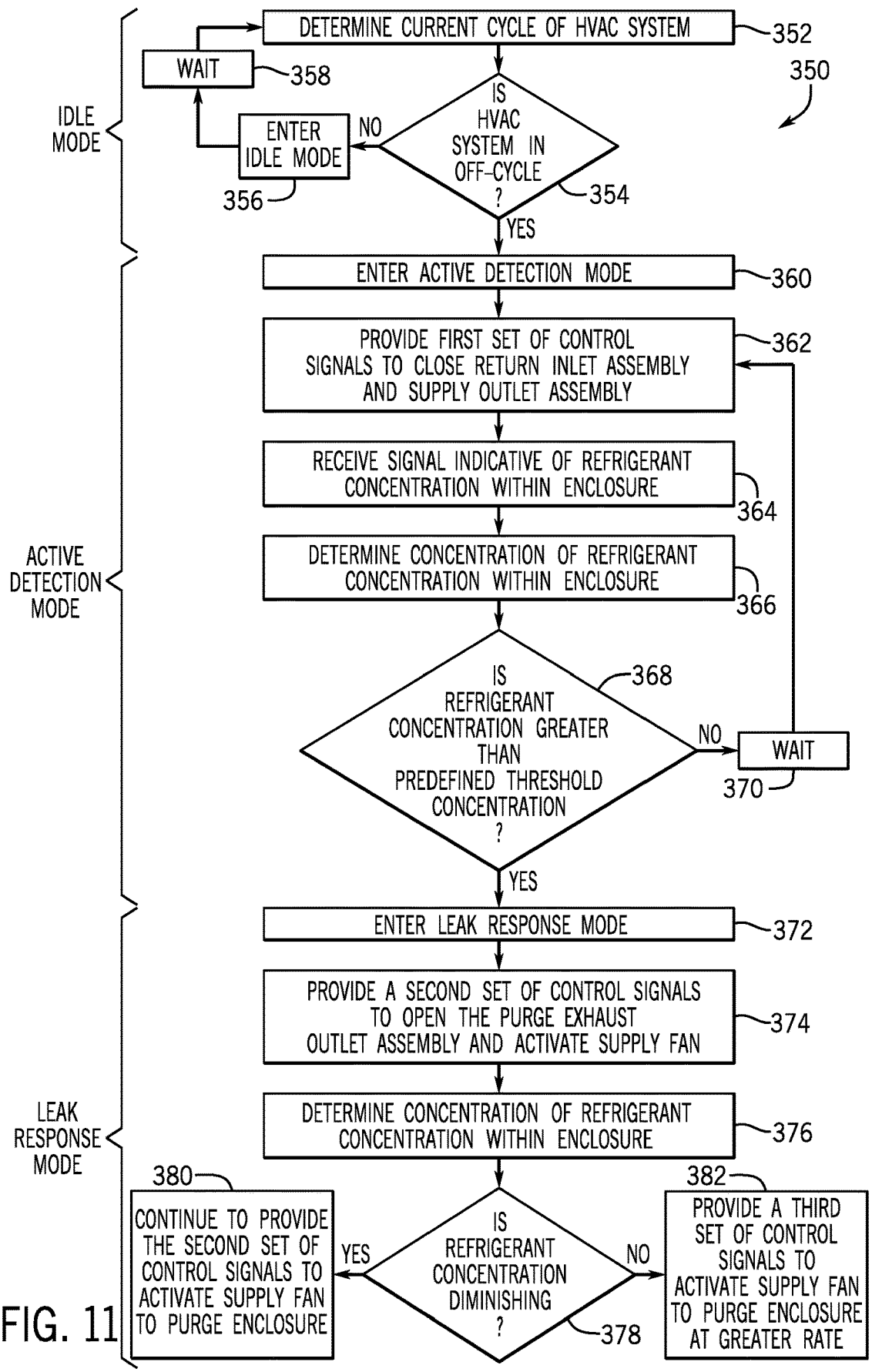
FIG. 11 is a flow diagram representing an embodiment of a process of operating the leak management system of FIG. 5, in accordance with present techniques.

FIG. 11 is a flow diagram illustrating an embodiment of a process 350 for operating the leak management system 102 of FIG. 5. It is to be understood that the steps discussed herein are merely exemplary, and certain steps may be omitted or performed in a different order that the order discussed herein. The process 350 may be performed by one or more processors, such as the processor 174 of the controller 170, an additional processor, or a combination thereof. First, as indicated in block 352, the illustrated process 350 includes the processor 174 determining a current cycle of the HVAC system 100. In embodiments in which the controller 170 is the HVAC controller or another suitable master controller, the controller 170 and its processor 174 are aware of when the HVAC system 100 changes between ON-cycle and OFF-cycle based on whether conditioning of the interior space of the building is requested. Additionally, in certain embodiments in which the controller 170 is communicatively coupled to the HVAC controller, the controller 170 may request that the HVAC controller provide the controller 170 with the current cycle of the HVAC system 100.

Based on the known current cycle of the HVAC system 100, the processor 174 determines whether the HVAC system 100 is in the OFF-cycle, as indicated in block 354. As discussed previously, the HVAC system 100 is in the OFF-cycle when the compressor 106 is off, such that the refrigerant 116 is not flowing within the closed refrigeration circuit 103. In response to determining, as indicated at block 354, that the HVAC system 100 is not in the OFF-cycle, the processor 174 enters idle mode, as illustrated in block 356. The idle mode of the controller 170 enables the HVAC system 100 to condition the interior space of the building. When in idle mode, the processor 174 may close the purge exhaust outlet assembly 164 to block conditioned air from being blown outside of the enclosure via the purge exhaust outlet 134. Additionally, the processor 174 waits, as indicated in block 358, a predefined amount of time before continuing to determine the current cycle of the HVAC system, as indicated in block 352. Thus, in idle mode, the controller 170 enables the HVAC system 100 to condition the interior space of the building.

As indicated in block 360, in response to determining that the HVAC system 100 is in the OFF-cycle, the processor 174 enters active detection mode. As discussed above, the controller 170 in the active detection mode fluidly isolates the interior 122 of the enclosure 120 from the interior space of the building and the exterior of the building to enable a refrigerant leak to build in concentration for detection by the concentration sensor 190. For example, the processor 174 provides a first set of control signals to close the return inlet assembly 160 and the supply outlet assembly 162, as indicated in block 362. Indeed, because the purge exhaust outlet assembly 164 is already closed, the first set of control signals enable the leak management system 102 to fluidly isolate the enclosure 120 from its environment. Then, moving to block 356, the processor 174 receives a signal indicative of a concentration of the refrigerant 116 within the enclosure 120. The concentration sensor 190 disposed proximate the evaporator coil 104 may transmit the signal indicative of the concentration of the refrigerant 116 to the processor 174. Indeed, the concentration sensor 190 may transmit the signal continuously, at regular intervals, or after detecting a change in the concentration of the refrigerant 116 in the enclosure 120. Moreover, in some embodiments, the processor 174 only receives the signals from the concentration sensor 190 when the HVAC system 100 is in the OFF-cycle to enable any leak of the refrigerant to accumulate within the enclosure 120, such as during times when the leak management system is in the idle mode.

Additionally, the processor 174 determines the concentration of the refrigerant 116 in the enclosure 120, as illustrated in block 366. As discussed above, the processor 174 determines the concentration of the refrigerant 116 based on the signal from the concentration sensor 190. The processor 174 also determines, as indicated in block 368, whether the concentration of the refrigerant 116 is greater than the predefined concentration threshold. For example, the predefined concentration threshold may be a parameter stored within the memory 172 of the controller 170, as discussed above. As illustrated by block 370, in response to determining that the concentration of the refrigerant 116 is less than the predefined concentration threshold, the processor 174 waits a predefined amount of time before returning to block 362 to continue providing the first set of control signals to maintain the return inlet assembly 160 and the supply outlet assembly 162 in closed positions via block 362. By waiting before continuing to determine the concentration of the refrigerant 116 within the enclosure 120, the process 350 extends a usable life of the concentration sensor 190 as compared to embodiments in which the concentration sensor 190 is operating continuously.

In response to determining that the concentration of the refrigerant 116 is greater than the predefined concentration threshold, the processor 174 enters the leak response mode, as set forth by block 372. That is, the controller 170 generally provides control signals to operate the leak management system 102 in leak response mode to mitigate a detected refrigerant leak. As illustrated by the present embodiment of the process 350, the processor 174 operates in the leak response mode by selectively actuating the airflow management assemblies 158 to enable a refrigerant laden airflow to be removed from the interior of the enclosure 120. More particularly, as indicated by block 374, the processor 174 provides a second set of control signals to open the purge exhaust outlet assembly 164 and to actuate the supply fan 154. In the present embodiment, the control signals provided by the processor 174 instruct the purge exhaust outlet assembly 164 to open by instructing the corresponding locking mechanisms 184 to unlatch the dampers 180, such that an airflow can open the unlatched damper 180 in the purge exhaust outlet 134. Additionally, when the supply fan 154 is actuated, the supply fan 154 moves a refrigerant-containing airflow out of the unlatched purge exhaust outlet assembly 164 to purge the enclosure 120 of the leaked refrigerant 116. Additionally, a replacement airflow is drawn into the enclosure 120 and mixes with the air and/or leaked refrigerant within the enclosure 120, thus lowering the concentration of the refrigerant 116 in the enclosure 120. In other embodiments, such as the embodiment of the leak management system 218 of FIG. 8, the purge inlet 220 having the purge inlet assembly 222 is provided to enable the replacement airflow 202 to be drawn into the enclosure 120 from a designated location fluidly coupled to the purge inlet 220. In such embodiments, the processor 174 additionally instructs the purge inlet assembly 222 to open in response to determining, via block 368, that the concentration of the refrigerant is greater than the predefined concentration threshold.

To perform dynamic feedback control after a threshold amount of time, the processor 174 determines the concentration of refrigerant 116 again, as indicated in block 376. Then, continuing along the illustrated process 350, the processor 174 determines whether the concentration of the refrigerant 116 is diminishing, as indicated in block 378. For example, the concentration of the refrigerant 116 may be diminishing when the concentration of the refrigerant 116 is decreasing from the initial detected concentration, decreasing below the predefined concentration threshold, and/or has a rate of change greater than a rate of change threshold. In response to determining that the concentration of the refrigerant is diminishing, the processor 174 continues to provide, via block 380, the second set of control signals to the airflow management assemblies 158 and the supply fan 154 to purge the enclosure 120. In response to determining that the concentration of the refrigerant is not diminishing at block 382, the processor 174 provides a third set of control signals to instruct the supply fan 154 to increase a speed of the supply fan 154, thus increasing a rate at which the leaked refrigerant is purged from the enclosure 120. Additionally, the control signal from the processor 156 may cause the components of the HVAC system 100 to perform any suitable control actions, such as transmitting an alert indicative of the concentration of the refrigerant 116 to a user or to a service technician and/or ceasing operation of the HVAC system 100. In general, a concentration of the refrigerant 116 that exceeds the predefined concentration threshold is indicative of a leak of the refrigerant 116. Thus, the control signals from the processor 174 instigates control actions which inform users or service technicians of the leak of the refrigerant 116 and/or control actions that mitigate the leak of the refrigerant.

Accordingly, the present disclosure is directed to a leak management system for detecting and mitigating leaks of a refrigerant within an enclosure of a HVAC system. The leak management system includes a plurality of airflow management assemblies configured to fluidly isolate an interior of the enclosure from ducts fluidly coupled to the enclosure. The leak management system also includes a concentration sensor that transmits signals indicative of the concentration of the refrigerant within the enclosure to a controller. The controller monitors the concentration of the refrigerant, in coordination with the operation of the HVAC system, and in response to determining that the concentration exceeds a predefined concentration threshold, the controller provides a control signal to modify operation of the HVAC system and/or the leak management system. For example, in embodiments of the leak management system having locking mechanisms associated with dampers of the airflow management assemblies, the control signal may instruct the locking mechanisms to lock or unlock the airflow management assemblies to enable a supply fan to purge air out of the enclosure. Additionally, the controller provides control signals to activate the supply fan, thus purging the leaked refrigerant out of the purge exhaust outlet. The controller may also cause a device to transmit an alert indicative of the concentration of the refrigerant and/or stop operation of the HVAC system until the leak of refrigerant is resolved. In this manner, the leak management system enables the detection and mitigation of refrigerant leaks substantially before the refrigerant may reach the predefined concentration threshold.

While only certain features and embodiments of the present disclosure have been illustrated and described, many modifications and changes may occur to those skilled in the art, such as variations in sizes, dimensions, structures, shapes and proportions of the various elements, values of parameters, such as temperatures, pressures, etc., mounting arrangements, use of materials, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, including those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A refrigerant leak management system of a heating, ventilation, and air conditioning (HVAC) unit comprising:
    an air handler having a return inlet, a supply outlet, and a purge exhaust, the purge exhaust routing from an interior of the air handler to an external environment and the purge exhaust being normally closed;
    a sensor configured to detect a leaked refrigerant in the interior of the air handler; and
    a controller configured to:
        determine a current cycle of the HVAC unit;
        operate in a first mode to close the return inlet, the supply outlet, and the purge exhaust in response to determining the HVAC unit is in an OFF-cycle to contain the leaked refrigerant within the interior of the air handler in the OFF-cycle of the HVAC unit; and
        operate in a second mode, based on detection of the leaked refrigerant, to open the purge exhaust to route the leaked refrigerant from the interior of the air handler to the external environment.

2. The refrigerant leak management system of claim 1, wherein the return inlet and the supply outlet are each normally open.

3. The refrigerant leak management system of claim 1, wherein the purge exhaust substantially blocks flow therethrough while the purge exhaust is closed.

4. The refrigerant leak management system of claim 1, wherein the controller is configured such that the supply outlet is closed during the second mode.

5. The refrigerant leak management system of claim 1, wherein the controller is configured to have a third mode in which the return inlet and the supply outlet are open and the purge exhaust is closed while the HVAC unit is actively conditioning a building.

6. A refrigerant leak management system of a heating, ventilation, and air conditioning (HVAC) unit comprising:
    a sensor configured to detect a leaked refrigerant in an interior of an air handling enclosure;
    a plurality of airflow management assemblies configured to fluidly isolate the interior of the air handling enclosure in a closed configuration, the plurality of airflow management assemblies comprising a return inlet assembly, a supply outlet assembly, and a purge exhaust outlet assembly; and
    a controller configured to:
        determine a current cycle of the HVAC unit;
        actuate the plurality of airflow management assemblies into the closed configuration upon determining the current cycle is an OFF-cycle to contain the leaked refrigerant within the interior of the air handling enclosure; and
        actuate the purge exhaust outlet assembly based on detection of the leaked refrigerant by the sensor such that the purge exhaust outlet assembly transitions from a closed position of the purge exhaust outlet assembly to an open position of the purge exhaust outlet assembly that opens the interior of the air handling enclosure to an external environment.

7. The refrigerant leak management system of claim 6, wherein the controller is configured to monitor the sensor while the plurality of airflow management assemblies are in the closed configuration.

8. The refrigerant leak management system of claim 7, wherein the controller is configured to monitor the sensor only while the plurality of airflow management assemblies are in the closed configuration.

9. The refrigerant leak management system of claim 7, wherein the sensor is operational only while the plurality of airflow management assemblies are in the closed configuration.

10. The refrigerant leak management system of claim 6, comprising the air handling enclosure and a fan configured to draw conditioned air through the air handling enclosure generally along a flow path from the return inlet assembly toward the supply outlet assembly.

11. The refrigerant leak management system of claim 10, wherein the controller is configured to operate the refrigerant leak management system in an idle mode upon determining the HVAC unit is in an ON-cycle to enable the HVAC unit to provide the conditioned air through the supply outlet assembly and to a conditioned interior space of a building.

12. The refrigerant leak management system of claim 6, wherein the return inlet assembly is configured to be disposed at a return inlet of the air handling enclosure, wherein the supply outlet assembly is configured to be disposed at a supply outlet of the air handling enclosure, and wherein the purge exhaust outlet assembly is configured to be disposed at a purge exhaust outlet of the air handling enclosure.

13. The refrigerant leak management system of claim 6, wherein the controller is configured to maintain the return inlet assembly and supply outlet assembly in open positions during an ON-cycle of the HVAC unit and to maintain the purge exhaust outlet assembly in a closed position during the ON-cycle of the HVAC unit.

14. The refrigerant leak management system of claim 6, wherein the sensor is configured to detect a concentration of the leaked refrigerant above a predefined concentration threshold.

15. The refrigerant leak management system of claim 6, wherein the controller is configured to actuate the purge exhaust outlet assembly based on the detection of the leaked refrigerant by the sensor being a leaked refrigerant concentration greater than a predefined concentration threshold.

16. The refrigerant leak management system of claim 6, wherein the controller is configured to block the HVAC unit from entering an ON-cycle based on the detection of the leaked refrigerant by the sensor.

17. The refrigerant leak management system of claim 6, wherein the external environment is an unconditioned interior space of a building associated with the HVAC unit, or a space exterior to the building associated with the HVAC unit.

18. The refrigerant leak management system of claim 6, wherein the air handling enclosure is the air handling enclosure of a packaged HVAC unit or the air handling enclosure of an interior HVAC unit of a split-type HVAC system.

19. The refrigerant leak management system of claim 6, wherein the plurality of airflow management assemblies comprises a purge inlet assembly configured to be disposed at a purge inlet of the air handling enclosure, and wherein the controller is configured to maintain the purge inlet assembly in a closed position during an ON-cycle of the HVAC unit.

20. The refrigerant leak management system of claim 19, wherein the controller is configured to actuate the purge inlet assembly based on the detection of the leaked refrigerant by the sensor to control an air flow entering the interior of the air handling enclosure from the external environment or an additional external environment.

21. The refrigerant leak management system of claim 6, wherein at least one airflow management assembly of the plurality of airflow management assemblies comprises a motorized damper configured to transition to an open position of the at least one airflow management assembly in response to being actuated by the controller.

22. The refrigerant leak management system of claim 6, wherein a particular airflow management assembly of the plurality of airflow management assemblies comprises a barometric damper configured to open in response to an air flow to enable the air flow to traverse the barometric damper.

23. The refrigerant leak management system of claim 22, wherein the particular airflow management assembly comprises a locking mechanism configured to selectively latch or unlatch the barometric damper of the particular airflow management assembly, wherein the locking mechanism is configured to maintain the barometric damper in a closed position of the particular airflow management assembly to block the air flow from traversing the particular airflow management assembly when locked.

24. The refrigerant leak management system of claim 23, wherein the locking mechanism comprises an actuator that latches or unlatches the barometric damper of the particular airflow management assembly in response to actuating control signals from the controller.

25. A refrigerant leak management system of a heating, ventilation, and air conditioning (HVAC) system comprising:
   a plurality of airflow management assemblies configured to be coupled to an air handling enclosure; and
   a controller configured to:
      determine a current cycle of the HVAC system;
      actuate the plurality of airflow management assemblies to isolate air within the air handling enclosure in response to determining the current cycle of an OFF-cycle to contain and concentrate leaked refrigerant within the air handling enclosure;
      communicate with a sensor configured to determine a leaked refrigerant concentration in the air handling enclosure to receive a signal from the sensor upon actuating the plurality of airflow management assemblies to isolate the air within the air handling enclosure; and
      direct isolated air from an interior of the air handling enclosure to an external environment via actuation of a purge exhaust outlet assembly of the plurality of airflow management assemblies when the leaked refrigerant concentration is greater than a predefined concentration threshold.

26. The refrigerant leak management system of claim 25, comprising the sensor, wherein the sensor is disposed proximate to an evaporator coil within the air handling enclosure.

27. The refrigerant leak management system of claim 25, comprising a fan communicatively coupled to the controller, wherein the controller is configured to activate the fan to direct the isolated air from within the air handling enclosure through the purge exhaust outlet and into the external environment.

28. The refrigerant leak management system of claim 25, comprising the air handling enclosure, wherein the air handling enclosure comprises a return inlet configured to receive an air flow from a conditioned interior space of a building, a supply outlet configured to direct the air flow to the conditioned interior space of the building, and a purge exhaust outlet configured to direct the air flow into the external environment.

29. The refrigerant leak management system of claim 28, comprising a plurality of ducts that respectively fluidly couple the return inlet of the air handling enclosure to the conditioned interior space, the supply outlet to the conditioned interior space, and the purge exhaust outlet to the external environment.

30. The refrigerant leak management system of claim 28, wherein the plurality of airflow management assemblies comprises a return inlet assembly disposed at the return inlet, a supply outlet assembly disposed at the supply outlet, and the purge exhaust outlet assembly disposed at the purge exhaust outlet of the air handling enclosure.

31. The refrigerant leak management system of claim 30, wherein the controller is configured to, in response to the HVAC system entering an ON-cycle, enter an idle mode, wherein the refrigerant leak management system opens the return inlet assembly and opens the supply outlet assembly in the idle mode.

32. The refrigerant leak management system of claim 30, wherein the air handling enclosure comprises a purge inlet configured to direct a fresh air flow into the air handling enclosure from the external environment or an additional external environment, and wherein the plurality of airflow management assemblies comprises a purge inlet assembly disposed at the purge inlet.

33. A method of operating a leak management system of a heating, ventilation, and air conditioning (HVAC) system comprising:
   determining, via a controller, that the HVAC system is entering an OFF-cycle;
   in response to determining that the HVAC system is entering the OFF-cycle, closing, via the controller, a return inlet assembly and closing, via the controller, a supply outlet assembly of an air handling enclosure to block air from entering and exiting the air handling enclosure of the HVAC system and to contain and concentrate leaked refrigerant within the air handling enclosure;
   determining, via the controller, a concentration of the leaked refrigerant within air of the air handling enclosure is greater than a predetermined threshold; and
   in response to determining the concentration of the leaked refrigerant being greater than a predetermined threshold, opening, via the controller, a purge exhaust outlet assembly and activating, via the controller, a supply fan disposed within the air handling enclosure to purge the air within the air handling enclosure through the purge exhaust outlet assembly and into an external environment.

34. The method of claim 33, wherein the concentration of the leaked refrigerant within air of the air handling enclosure is a first concentration measured via the sensor at a first time, and the method comprises:
   determining, via the controller, a second concentration of the leaked refrigerant within air of the air handling enclosure at a second time; and
   in response to determining the additional concentration of the leaked refrigerant being greater than the predetermined threshold, increasing, via the controller, a fan speed of the supply fan to purge the air from the air handling enclosure at a greater speed.

35. The method of claim 33, wherein the concentration of the leaked refrigerant within air of the air handling enclosure is a first concentration measured via the sensor at a first time, and the method comprises:
- determining, via the controller, a second concentration of the leaked refrigerant within the air of the air handling enclosure at a second time; and
- in response to the second concentration of the leaked refrigerant being less than the predetermined threshold, opening, via the controller, the return inlet assembly, opening, via the controller, the supply outlet assembly, and enabling, via the controller, the HVAC system to subsequently enter an ON-cycle.

36. The method of claim 35, comprising:
- determining, via the controller, the first concentration of the leaked refrigerant or the second concentration of the leaked refrigerant is less than the predetermined threshold; and
- in response to the first concentration of the leaked refrigerant or the second concentration of the leaked refrigerant being less than the predetermined threshold, closing, via the controller, the purge exhaust outlet assembly when the purge exhaust outlet assembly is open.

37. A refrigerant leak management system of a heating, ventilation, and air conditioning (HVAC) unit comprising:
- an air handler having a return inlet, a supply outlet, and a purge exhaust, the purge exhaust routing from an interior of the air handler to an external environment and the purge exhaust being normally closed;
- a sensor configured to detect a leaked refrigerant in an interior of the air handler; and
- a controller configured to:
  - determine a current cycle of the HVAC unit;
  - close the return inlet, the supply outlet, and the purge exhaust in response to determining the current cycle is an OFF-cycle to contain the leaked refrigerant in the interior of the air handler;
  - communicate with the sensor to receive a signal from the sensor upon closing the return inlet, the supply outlet, and the purge exhaust; and
  - open the purge exhaust upon detection of the leaked refrigerant by the sensor based on the signal.

38. The refrigerant leak management system of claim 37, wherein the controller is configured to open the return inlet and the supply outlet under standard operating conditions of the HVAC unit.

39. The refrigerant leak management system of claim 38, wherein the purge exhaust is substantially closed under standard operating conditions of the HVAC unit.

40. The refrigerant leak management system of claim 38, wherein the controller is configured under a leak response mode to open the purge exhaust and to route airflow from the interior of the air handler to an external environment.

* * * * *